Oct. 13, 1964     T. WYATT     3,152,774
SATELLITE TEMPERATURE STABILIZATION SYSTEM
Filed June 11, 1963

THEODORE WYATT
INVENTOR.

BY

*Claude Funkhouser*

ATTORNEY.

United States Patent Office 3,152,774
Patented Oct. 13, 1964

3,152,774
SATELLITE TEMPERATURE STABILIZATION SYSTEM
Theodore Wyatt, Silver Spring, Md., assignor to the United States of America as represented by the Secretary of the Navy
Filed June 11, 1963, Ser. No. 287,160
9 Claims. (Cl. 244—1)

This invention relates generally to space vehicles, and more particularly to an improved temperature stabilization system for orbiting space satellites and the like.

One of the problems in satellite design is that of temperature control, particularly with respect to the upper and lower extremes attained. Generally, if the thermal situation of a satellite, or a discrete, relatively thermally-independent portion thereof, is primarily the result of absorption of solar radiation and emission of infra-red radiation, then the average temperature present is set by the ratio of absorption to emissivity ($a/e$), and maximum and minimum values around this average are determined by the absolute values of $a$ and $e$, as well as by the size of the heat sink available and the conductivity to the heat sink.

One temperature problem area in satellites is the paddles or blades commonly employed to support an array of solar cells, particularly when the paddles are relatively thermally independent. Normally a paddle's surface is as nearly covered as possible by solar cells. Even if the cells are covered by optical filters the available range of values for $a$ and $e$ is fairly limited, and thus little can be done about the average temperature to which they are subjected. Fortunately, the average temperature is typically an acceptable value. However, the maximum and minimum temperatures attained can be excessive, so that when the cells are in sunlight they can readily attain a high temperature which will damage the cement securing them in place and will reduce their electrical output. Likewise, in the dark a damaging cold temperature may be attained. Furthermore, the range through which the temperature cycles may produce harmful stresses and fatigue failure.

The amplitude of the temperature's cyclic variation may be reduced by increasing the thermal inertia of the blades, which may be accomplished by increasing the size of the available heat sink. However, since weight is normally an important consideration, it is undesirable to provide extra mass of structure in satellites to function as a heat sink through the specific heat of the material. In the instant invention the cyclic extremes in temperature are controlled within tolerable limits by utilizing the latent heat properties of certain materials, particularly the latent heat of vaporization.

It is the principal object of this invention, therefore, to provide a self-operating, relatively light-weight system for controlling the temperature of an orbiting space satellite.

Another object of the present invention is to provide a satellite temperature control system so constructed as to utilize to advantage temperature differentials between discrete portions of an orbiting space satellite.

Other objects and many of the attendant advantages of this invention will be readily appreciated as the same becomes better understood by reference to the following detailed description when considered in connection with the accompanying drawings, wherein.

In the temperature control system of the instant invention the solar cell paddles, or other satellite portions for which it is desired to control the temperature variation while in orbit, are constructed of sufficient metal only for structural purposes, and the desired thermal capacity is obtained by use of a fluid coolant material such as water, methyl chloride, or one of the Freons. The thermal capacity is supplied by the specific heat of the fluid, and more importantly by the heat of fusion or by the heat of vaporization thereof. In contemplated design applications the temperature ranges involved will require changes back and forth from the liquid to the vapor state for representative fluid materials, rather than the solid state, except in the case of water.

Because different distinct portions of a satellite will be in sunlight or darkness at different times, it is desirable to provide a means for transferring the fluid medium between said portions. In the instant invention this is accomplished by interconnecting the portions with tubing through a central insulated sump or reservoir. In order to facilitate the transfer of fluid, the cavities within the blades, the tubing, and the sump are all lined with a fibrous material which will function in the manner of a wick. By this means fluid is transferred from one portion of the system to another to make up for the depletion by vaporization of the fluid in that portion of the system subjected to the higher temperatures due to localized solar radiation. Similarly, those portions of the system shadowed from solar radiation and consequently established at a lower temperature will be the site of condensation of the vapor phase to a liquid state, the latter being transferred away by the aforementioned wick action. Since the system is intended to operate in a satellite in orbit, the gravity-free environment will facilitate the transfer of fluid by wick action.

Figure 1:
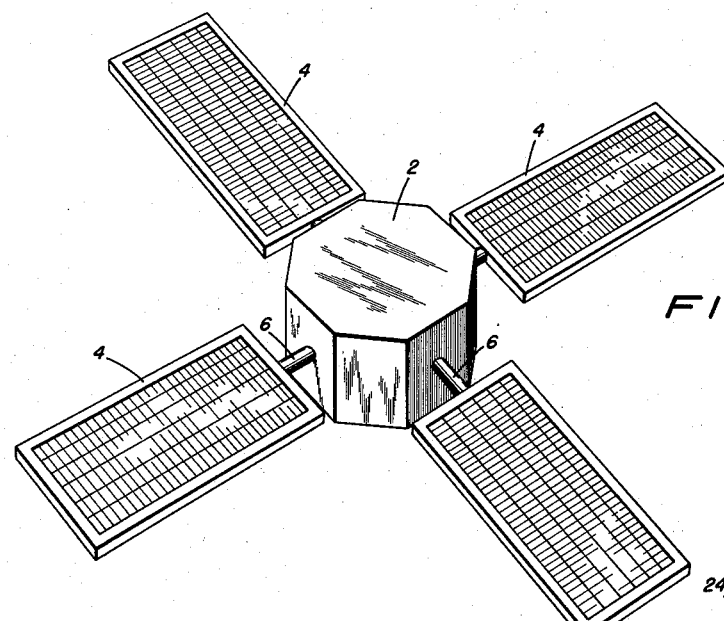
FIG. 1 is a perspective of a space satellite having four solar cell-bearing paddles projecting therefrom.

Referring now to the drawings, a satellite body 2 having four solar cell paddles 4 projecting therefrom is shown in FIG. 1, the paddles being connected to the body by tubes 6. A portion of one of the paddles 4 is shown in section in FIG. 2, wherein is seen a structural supporting frame 8 having cavities 10 therein which are interconnected by passageways 12. The cavities 10 are lined with fluid-impregnated wick material 14, which may be a suitable textile, a flock, or other fibrous material. The external upper and lower surfaces of the frame 8 have, respectively, a plurality of overlapped solar cells 16 and 18 secured thereto by layers of cement 20 and 22.

Figure 2:
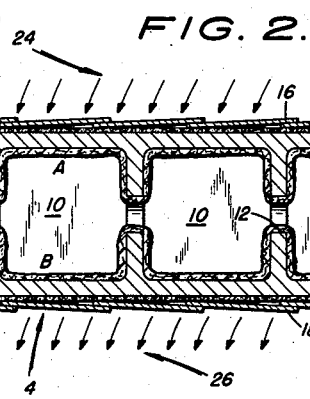
FIG. 2 is a cross-section of a portion of a paddle, showing the manner in which the invention functions.

In FIG. 2 it is assumed that the paddle is so disposed relative to the sun that the upper layer of solar cells 16 are in sunlight and the lower layer of cells 18 are in darkness. When the paddle is so positioned solar radiation 24 impinges upon the cells 16, tending to heat the paddle, while at the same time thermal radiation 26 is emitted from the bottom layer of solar cells, tending to lower the paddle temperature. A temperature differential thus exists between areas A and B within the cavities 10. At area A the tendency is for evaporation of the fluid in the wick material 14 to occur, while at area B condensation tends to occur. The consequent almost continuous changes of state of the fluid thus create a heat sink, which tends to limit the extent to which the temperature of the paddle varies about the average temperature measured over the satellite's orbit. In most satellite designs, the amount of condensation occurring while the paddle is fully exposed to sunlight will be negligible, and hence a means of transferring fluid from dark portions of the satellite to sunlit portions is desirable.

Figure 3:
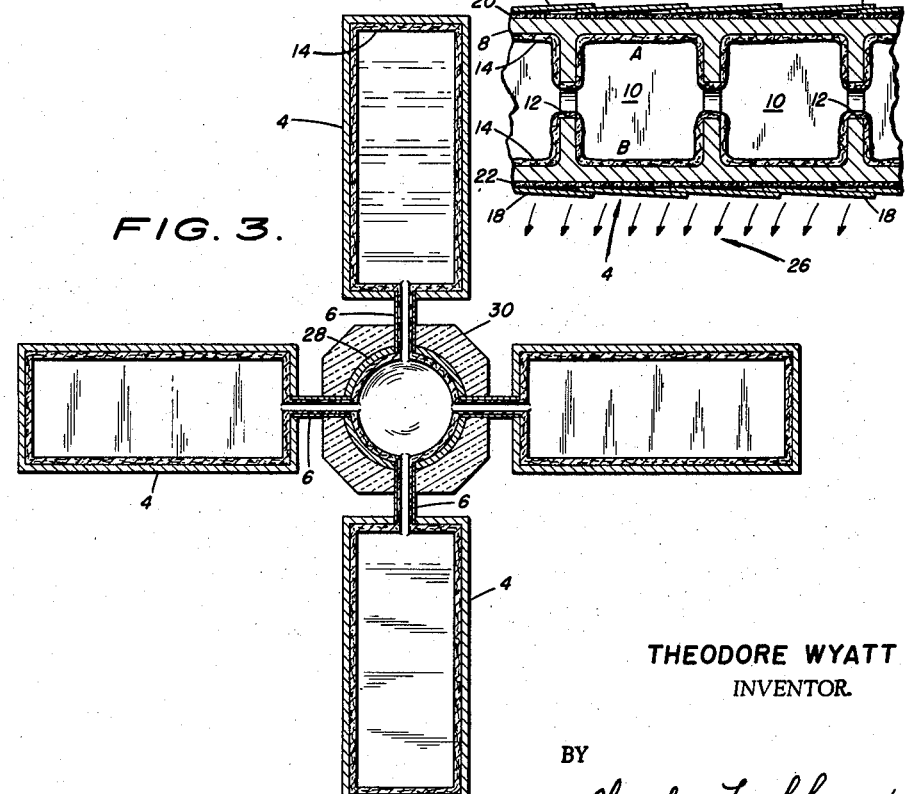
FIG. 3 is a schematic of the complete satellite temperature control system.

Referring now to FIG. 3 of the drawings, the entire temperature control system of the invention is shown in schematic. The interiors of the paddles 4 are all interconnected by their supporting tubes 6 through a central reservoir 28, the latter being positioned within the satellite body 2 and being surrounded by insulation 30. The wick material 14 extends throughout the interior of the system, thus interconnecting the various portions thereof. The reservoir 28 is insulated to maintain it at as constant a temperature as possible, whereby changes of state of the fluid will normally not occur therein, but rather will occur only in the paddles.

The absorption characteristics of the particular wick material will determine whether additional fluid other than that impregnated in the wick will be necessary. If more fluid is required, it can be deposited in the reservoir cavity.

In operation, the satellite while in orbit will often have one or more paddles in sunlight and one or more in darkness. When this occurs, the fluid within the sunlit paddles will, as explained, tend to vaporize, whereas that in the dark paddles will condense to a liquid state. The paddles being interconnected, the liquid fluid will be moved by wick action from the cool, dark paddles through the central reservoir, and to the sunlit paddles, where it will tend to vaporize. Similarly, vaporized fluid will tend to flow through the hollow tubes and reservoir from sunlit paddles to dark ones, where it will tend to condense. The net effect is to provide a much larger heat sink for sunlit paddles than could be contained within their cavities only, which in turn tends to further lessen the extent to which the paddle temperature varies from the cyclic average.

Obviously, many modifications and variations of the present invention are possible in the light of the above teachings. It is therefore to be understood that within the scope of the appended claims the invention may be practiced otherwise than as specifically described.

What is claimed is:

1. In a satellite having a body, a temperature stabilization system utilizing the change in state of a fluid as a heat sink, the combination comprising,
   (A) a heat receiving means connected with the body,
   (B) a fluid coolant in the heat receiving means,
   (C) a reservoir means in the satellite, and
   (D) a capillary means in the heat receiving means and in said reservoir means and conducting said coolant from said reservoir means to said heat receiving means.

2. The cobination as recited in claim 1, including means for interconnecting said heat receiving means with said reservoir means, and capillary means in said last-mentioned means.

3. The combination as recited in claim 2, wherein said capillary means comprises a wick-like material.

4. The combination as recited in claim 1, wherein said reservoir means is disposed in the body and wherein said heat receiving means comprises at least one solar cell paddle projecting from said body and having coolant receiving cavities therein.

5. The combination as recited in claim 4, including a tube for interconnecting said paddle with said reservoir means.

6. The combiantion as recited in claim 5, wherein said capillary means is secured to the walls defining said cavities, said reservoir and said tube and cooperates with said reservoir means and said tube to distribute said coolant to said cavities.

7. The combination as recited in claim 6, wherein said capillary means comprises a wick-like material.

8. A temperature stabilization system comprising, in combination with a satellite having a body, and a plurality of solar cell supporting paddles,
   tubes connecting the paddles with the body,
   said body having a reservoir therein and each of said paddles having cavities therein, the cavities in each paddle being in communication serially,
   a fluid coolant, and
   capillary means secured to the walls defining the cavities, to the inner wall of each of the tubes and to the inner wall of the reservoir,
   said capillary means being impregnated by said coolant and conducting said coolant between said reservoir and said cavities, whereby said paddles will be cooled.

9. A satellite as recited in claim 8, wherein the capillary means is constituted by wicking.

References Cited in the file of this patent

UNITED STATES PATENTS 3,090,212     Anderson _____ May 21, 1963

OTHER REFERENCES

Western Aviation, Missile and Space Industries Magazine, November 1960, page 24.